US011933372B2

(12) United States Patent
Ge et al.

(10) Patent No.: US 11,933,372 B2
(45) Date of Patent: Mar. 19, 2024

(54) CLUTCH DEVICE

(71) Applicant: Autoliv Development AB, Vargarda (SE)

(72) Inventors: Liang Ge, Shanghai (CN); Licheng Yu, Shanghai (CN)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/904,351

(22) PCT Filed: Dec. 25, 2020

(86) PCT No.: PCT/CN2020/139591
§ 371 (c)(1),
(2) Date: Aug. 16, 2022

(87) PCT Pub. No.: WO2021/164420
PCT Pub. Date: Aug. 26, 2021

(65) Prior Publication Data
US 2023/0068207 A1    Mar. 2, 2023

(30) Foreign Application Priority Data

Feb. 21, 2020  (CN) .......................... 202010107880.8

(51) Int. Cl.
*F16D 41/06*   (2006.01)
*B60R 22/34*   (2006.01)
*F16D 41/067*  (2006.01)

(52) U.S. Cl.
CPC .............. *F16D 41/06* (2013.01); *B60R 22/34* (2013.01); *F16D 41/067* (2013.01)

(58) Field of Classification Search
CPC ....... F16D 41/06; F16D 41/067; B60R 22/34; B60R 2022/468; B60R 22/46; B60R 22/3416
See application file for complete search history.

(56) References Cited

U.S. PATENT DOCUMENTS 5,451,008 A * 9/1995 Hamaue .............. B60R 22/4628
                                                      242/374
5,529,258 A * 6/1996 Dybro ................ B60R 22/4619
                                                      242/374

(Continued)

FOREIGN PATENT DOCUMENTS

CN       104760567 A     7/2015
CN       110466474 A    11/2019

(Continued)

*Primary Examiner* — Jacob S. Scott
*Assistant Examiner* — Farhana Pervin
(74) *Attorney, Agent, or Firm* — DICKINSON WRIGHT PLLC

(57) ABSTRACT

An engagement and disengagement device used in a seat belt retractor including a first rotating member capable of being driven to rotate about a rotation axis thereof, a second rotating member provided coaxially with the first rotating member and connected to a reel of the seat belt retractor in an anti-torsion manner, and a transmission member provided between the first and second rotating member. The first rotating member is capable of transmitting torque to the second rotating member by means of the transmission member. The transmission member includes a holder and a transmission element in the holder. A first elastic component elastically holds the transmission element by radially exerting a force that enables the transmission element to be located away from the first or the second rotating member, and the first elastic component is integrated on the holder.

15 Claims, 3 Drawing Sheets

(56) References Cited

U.S. PATENT DOCUMENTS

| | | | |
|---|---|---|---|
| 6,443,380 B1* | 9/2002 | Biller | F16D 25/087 |
| | | | 280/806 |
| 7,761,207 B2* | 7/2010 | Midorikawa | B60R 22/44 |
| | | | 701/45 |
| 10,315,617 B2* | 6/2019 | Franz | B60R 22/405 |
| 2003/0052209 A1* | 3/2003 | Honl | B60R 22/46 |
| | | | 242/374 |
| 2005/0082411 A1* | 4/2005 | Prokscha | B60R 22/46 |
| | | | 242/390.8 |
| 2005/0247811 A1* | 11/2005 | Prokscha | B60R 22/46 |
| | | | 242/390.8 |
| 2008/0203808 A1* | 8/2008 | Yoshioka | B60R 22/405 |
| | | | 297/478 |
| 2008/0252060 A1* | 10/2008 | Saito | B60R 22/44 |
| | | | 280/806 |
| 2011/0056789 A1* | 3/2011 | Holbein | B60R 22/46 |
| | | | 192/45.1 |
| 2016/0244020 A1* | 8/2016 | Umakoshi | B60R 22/46 |
| 2018/0178750 A1* | 6/2018 | Maemura | B60R 22/46 |
| 2019/0210491 A1* | 7/2019 | Kitayama | F16D 15/00 |
| 2019/0211890 A1* | 7/2019 | Shibata | F16D 41/06 |

FOREIGN PATENT DOCUMENTS

| | | |
|---|---|---|
| DE | 10015974 A1 | 10/2001 |
| JP | 2006282097 A | 10/2006 |
| KR | 20120044757 A | 5/2012 |
| WO | 2019216970 A1 | 11/2019 |

* cited by examiner

CLUTCH DEVICE

TECHNICAL FIELD

The present invention relates to an engagement and disengagement device used in a seat belt retractor.

BACKGROUND

Existing seat belt retractors can provide functions such as pre-collision protection, human-machine interaction during driving, and comfort. Before a control unit determines that a vehicle may have a collision, an active seat belt retractor can retract a certain length of a seat belt by means of a motor, so as to gently constrain an occupant, and after the control unit determines that the risk of collision has disappeared, the active seat belt retractor allows the seat belt to be freely pulled.

Seat belt retractors include engagement and disengagement devices, which are mainly divided into two categories: devices without a holder and devices with a holder. In an engagement and disengagement device without a holder, balls are secured in an inner ring or an outer ring, and an input end and an output end cannot completely disengage from each other. When the device is used in a seat belt, motion control can be achieved if a motor serves as the input end. However, complete disengagement cannot be performed, such that when an occupant pulls or retracts the seat belt, the seat belt may be stuck. In an engagement and disengagement device with a holder, an input end and an output end can be separated from each other. However, such engagement and disengagement device cannot realize the function of comfort that requires low speed start-up, or has many parts and a complex structure, and is not easy to install.

Therefore, an improved engagement and disengagement device used in a seat belt retractor is desired.

SUMMARY

An objective of the present invention is to provide an improved engagement and disengagement device for a seat belt retractor. Specifically, the engagement and disengagement device can realize the function of comfort that requires low speed start-up, has less parts and a simple structure, and is easy to install.

Provided in the present invention is an engagement and disengagement device, used in a seat belt retractor, and comprising:

a first rotating member, capable of being driven to rotate about a rotation axis thereof;
a second rotating member, provided coaxially with the first rotating member, and connected to a reel of the seat belt retractor in an anti-torsion manner; and a transmission member, provided between the first rotating member and the second rotating member, wherein the first rotating member is capable of transmitting, in a first rotation direction, torque to the second rotating member by means of the transmission member,
wherein the transmission member is capable of rotating between an engagement position and a non-engagement position relative to the first rotating member, and when the transmission member is at the engagement position, the transmission member engages with both the first rotating member and the second rotating member such that the first rotating member, the second rotating member, and the transmission member are capable of rotating together, and when the transmission member is in the non-engagement position, the transmission member does not engage with the first rotating member or the second rotating member such that the first rotating member and the second rotating member are capable of rotating freely relative to each other.

The transmission member comprises a holder and a transmission element provided in the holder, and
the engagement and disengagement device further comprises a first elastic component used to elastically hold the transmission element by radially exerting, on the transmission element, a force that enables the transmission element to be located away from the first rotating member or the second rotating member, the first elastic component being integrated on the holder.

According to an embodiment of the present invention, the holder has an annular shape, and is rotatably sleeved on the second rotating member.

According to an embodiment of the present invention, the holder comprises a first side ring and a second side ring, and the first elastic component is located between the first side ring and the second side ring.

According to an embodiment of the present invention, the first elastic component comprises a cantilever spring, one end of the cantilever spring being fixed to the holder, and the other end extending to the transmission element.

According to an embodiment of the present invention, the holder further comprises a connection member connected between the first side ring and the second side ring, and an end of the first elastic component is fixed to the connection member.

According to an embodiment of the present invention, multiple first elastic components are arranged at intervals in a circumferential direction of the holder, and a pair of the first elastic components are configured to be located on two circumferential sides of the transmission element.

According to an embodiment of the present invention, the engagement and disengagement device further comprises a base provided with an accommodation cavity used to accommodate the first rotating member and the transmission member.

According to an embodiment of the present invention, the engagement and disengagement device further comprises a cover plate connected to the base to seal the accommodation cavity.

According to an embodiment of the present invention, the engagement and disengagement device further comprises a second elastic component, and the second elastic component is used to exert a biasing force that enables the transmission member to abut the cover plate, the second elastic component being integrated on the holder.

According to an embodiment of the present invention, the second elastic component is provided on an axial end surface of the holder opposite the cover plate.

According to an embodiment of the present invention, the second elastic component extends axially towards the cover plate so as to extend beyond the holder by a distance.

According to an embodiment of the present invention, the second elastic component is configured such that one end thereof is fixed to the holder and the other end thereof is bent to form a bent portion.

According to an embodiment of the present invention, the holder comprises a first position-limiting portion located on an axial end surface thereof, the first rotating member comprises a second position-limiting portion located on a corresponding axial end surface thereof, and the first position-limiting portion and the second position-limiting portion are capable of cooperating with each other to limit a rotation angle of the holder relative to the first rotating member.

According to an embodiment of the present invention, the first position-limiting portion and the second elastic component are provided on the same axial end surface of the holder.

DETAILED DESCRIPTION

Figure 1:
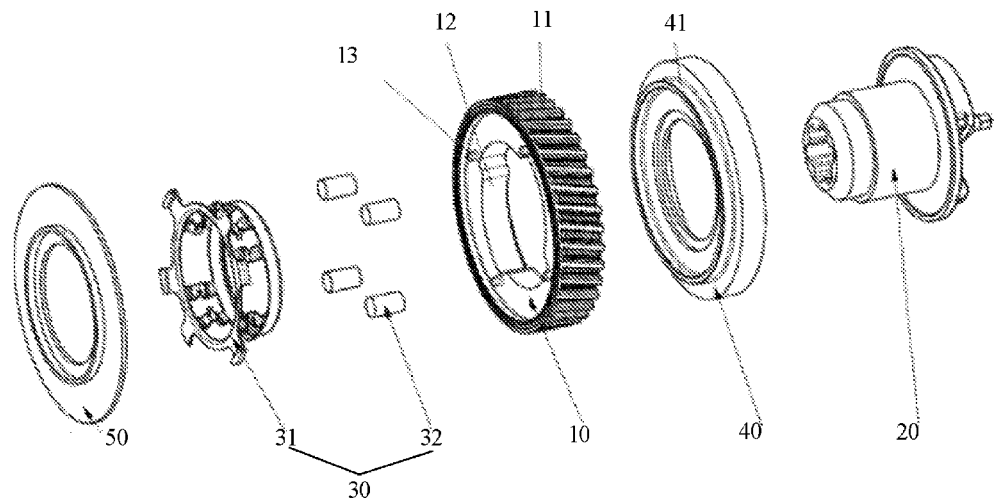
FIG. 1 schematically shows an exploded view of an engagement and disengagement device of a seat belt retractor according to an embodiment of the present invention.

Specific embodiments of an engagement and disengagement device according to the present invention will be described below with reference to the accompanying drawings. The following detailed description and the accompanying drawings are used to illustratively explain the principles of the present invention. The present invention is not limited to the described preferred embodiments, and the protection scope of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

FIG. 1 schematically shows an exploded view of an engagement and disengagement device of a seat belt retractor according to an embodiment of the present invention. As shown in FIG. 1, the engagement and disengagement device may include a first rotating member 10, a second rotating member 20, and a transmission member 30.

The first rotating member 10 can be driven to rotate about a rotation axis thereof. The first rotating member 10 may have a hollow structure such that at least part of the second rotating member 20 passes through the same. In some embodiments, the first rotating member 10 includes a toothed portion 11 located on an outer peripheral surface thereof. The toothed portion 11 may mesh with a driving device of a seat belt retractor by means of a gear mechanism, such as a worm gear and worm, a rack and pinion, etc.

According to an embodiment of the present invention, the first rotating member 10 includes an engagement portion 12 defined on a radial inner surface thereof. In an exemplary embodiment, multiple engagement portions 12, for example four, are defined on the radial inner surface of the first rotating member 10. The engagement portion 12 is configured to engage with the transmission member 30.

The second rotating member 20 is provided coaxially with the first rotating member 10. The second rotating member 20 may be connected to a reel of the seat belt retractor in an anti-torsion manner, so as to transmit torque to the reel. In an exemplary embodiment, at least part of a radial outer surface of the second rotating member 20 may engage with the transmission member 30.

The transmission member 30 is provided between the first rotating member 10 and the second rotating member 20. In an exemplary embodiment, the transmission member 30 may include a holder 31 and a transmission element 32 provided in the holder 31. The holder 31 is used to hold one or more transmission elements 32. In some embodiments, the number of transmission elements 32 is the same as the number of engagement portions 12. In some embodiments, the transmission element 32 may be a rolling element, such as a cylindrical roller, a needle roller, etc.

Figure 2:
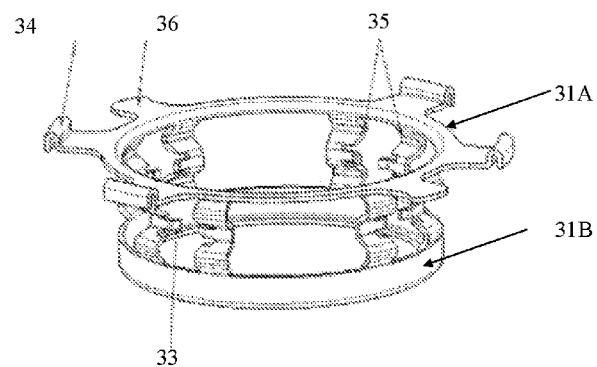
FIG. 2 shows a perspective view of a holder of the engagement and disengagement device according to an embodiment of the present invention.

FIG. 2 shows a perspective view of a holder of the engagement and disengagement device according to an embodiment of the present invention. The holder of the engagement and disengagement device according to the embodiment of the present invention will be described below with reference to FIG. 2.

As shown in FIG. 2, the holder 31 has an annular shape, and can be rotatably sleeved on the second rotating member 20. In the exemplary embodiment shown in FIG. 2, the holder 31 includes a first side ring 31A and a second side ring 31B. In addition, the holder 31 further includes connection members 35 connected between the first side ring 31A and the second side ring 31B. The connection members 35 are arranged in a circumferential direction of the holder 31, and define multiple retaining portions together with the first side ring 31A and the second side ring 31B. The transmission element 32 may be disposed and held in the retaining portion. The retaining portion of the holder 31 may restrict axial movement of the transmission element 32 relative to the holder 31 by means of, for example, the first side ring 31A and the second side ring 31B.

With continued reference to FIG. 2, the engagement and disengagement device further includes a first elastic component 33. The first elastic component 33 elastically holds the transmission element 32 by radially exerting, on the transmission element 32, a force that enables the transmission element to be located away from the first rotating member 10 or the second rotating member 20. In addition, the first elastic component 33 is integrated on the holder 31.

Figure 5:
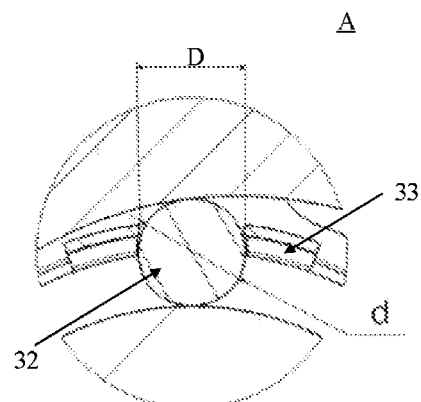
FIG. 5 shows an enlarged view of A in FIG. 4.

In an exemplary embodiment, the first elastic component 33 is located between the first side ring 31A and the second side ring 31B, and an end of the first elastic component 33 is fixed to the connection member 35. Specifically, multiple first elastic components 33 are arranged at intervals in a circumferential direction of the holder 31, and a pair of the first elastic components 33 are configured to be located on two circumferential sides of the transmission element 32. The first elastic component 33 includes a cantilever spring, one end of the cantilever spring being fixed to the holder 31, and the other end extending to the transmission element 32 (see FIG. 5). The first elastic component 33 shown in FIG. 2 is in an initial state in which the first elastic component 33 has not deformed. The first elastic component 33 as shown in FIG. 5 deforms radially outwards under the action of the transmission element 32, and in this case, in order to restore from deformation, the first elastic component 33 exerts a radially inward biasing force on the transmission element 32. That is, the first elastic component 33 can elastically hold the transmission element 32 by radially exerting, on the transmission element 32, a force that enables the transmission element to be located away from the second rotating member 20.

Figure 3:
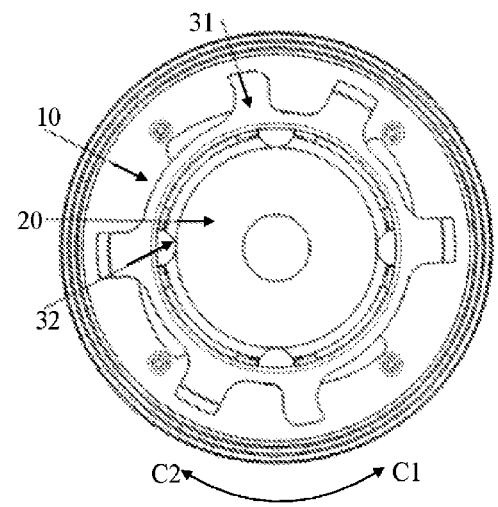
FIG. 3 shows a side view of the engagement and disengagement device according to an embodiment of the present invention.
Figure 4:
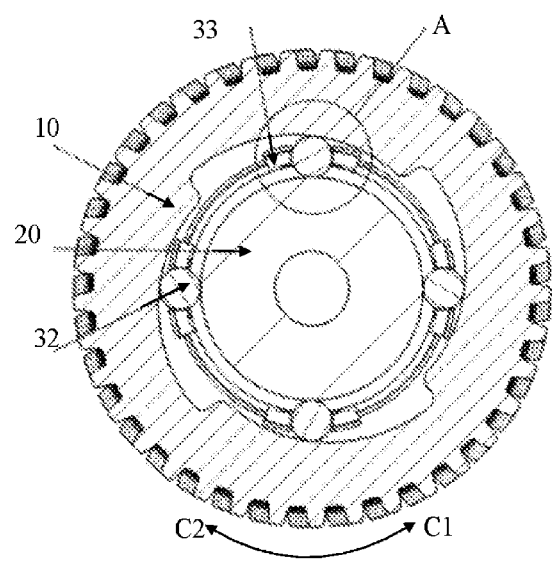
FIG. 4 shows a cross-sectional view of the engagement and disengagement device according to an embodiment of the present invention.

FIG. 3 shows a side view of the engagement and disengagement device according to an embodiment of the present invention. FIG. 4 shows a cross-sectional view of the engagement and disengagement device according to an embodiment of the present invention. As shown in FIG. 3 and FIG. 4, the distance from the engagement portion 12 to the rotation axis increases gradually in a first rotation direction C1 (a counterclockwise direction). Viewed axially, the engagement portion 12 may have any suitable curvilinear shape, such as an involute, etc. FIG. 3 and FIG. 4 show that the engagement and disengagement device is in an engaged state, in which the transmission element 32 of the transmission member 30 maintains a gap-free engagement with both the first rotating member 10 (the engagement portion 12) and the radial outer surface of the second rotating member 20 radially. FIG. 5 shows an enlarged view of A in FIG. 4. In an exemplary embodiment, in order to radially exert, on the transmission element 32, the force that enables the transmission element to be located away from the first rotating member 10 or the second rotating member 20, a diameter d of the transmission element 32 is greater than a distance D between two opposite end surfaces of a pair of first elastic components used to exert a force on the transmission element 32.

Figure 6:
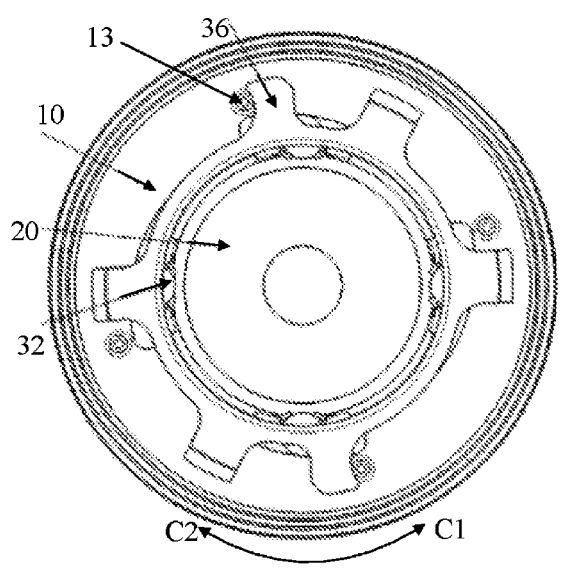
FIG. 6 shows a side view of the engagement and disengagement device according to an embodiment of the present invention.

FIG. 6 shows a side view of the engagement and disengagement device according to an embodiment of the present invention. As shown in FIG. 6, the engagement and disengagement device is in a disengaged state, in which the transmission element 32 of the transmission member 30 does not engage with the second rotating member 20.

The transmission member 30 can rotate between an engagement position and a non-engagement position relative to the first rotating member 10.

In the engaged state shown in FIG. 3 and FIG. 4, the transmission element 32 radially engages with both the first rotating member 10 (the engagement portion 12) and the second rotating member 20. When the first rotating member 10 rotates in the first rotation direction C1, the first rotating member 10 may transmit torque to the second rotating member 20 by means of the transmission member 30 (for example, the transmission element 32), such that the first rotating member 10, the transmission element 32, and the second rotating member 20 can rotate together.

From the engaged state of the engagement and disengagement device, when the first rotating member 10 rotates in a second rotation direction C2 opposite the first rotation direction C1, the transmission element 32 of the transmission member 30 can disengage from the second rotating member 20 (as shown in FIG. 6), such that the first rotating member 10 and the second rotating member 20 can rotate freely relative to each other.

As shown in FIG. 4, in the engaged state, the transmission element 32 is subject to a force from the engagement portion 12, and therefore overcomes the biasing force of the first elastic component 33. Accordingly, the transmission element 32 moves radially inwards to engage with the second rotating member 20. As shown in FIG. 6, in the disengaged state, the transmission element 32 is subject to the biasing force of the first elastic component 33, and is radially spaced apart from the second rotating member 20.

According to an embodiment of the present invention, the engagement and disengagement device may further include a base 40 and a cover plate 50, as shown in FIG. 1. The base 40 is provided with an accommodation cavity used to accommodate the first rotating member 10 and the transmission member 30. The cover plate 50 can be connected to the base 40 to seal the accommodation cavity. In an exemplary embodiment, the cover plate 50 can be fixed to an axial end surface of the base 40 by means of, for example, a screw, etc. The base 40 and the cover plate 50 may each have a central through-hole, such that at least part of the second rotating member 20 can pass through the same.

The base 40 may serve as an axial bearing for the first rotating member 10, such that the first rotating member 10 can be rotatably supported in the base 40. In some embodiments, the first rotating member 10 includes an annular recess (not shown) extending axially, and the base 40 includes an annular protrusion 41 extending axially. The annular protrusion 41 of the base 40 can be inserted into the annular recess of the first rotating member 10 so as to rotatably support the first rotating member 10.

According to some embodiments of the present invention, the holder 31 may further include a first position-limiting portion 36 located on an axial end surface thereof, and the first rotating member 10 may include a second position-limiting portion 13 located on a corresponding axial end surface thereof. The first position-limiting portion 36 of the holder 31 and the second position-limiting portion 13 of the first rotating member 10 can cooperate with each other to limit a rotation angle of the holder 31 relative to the first rotating member 10. In an exemplary embodiment, the first position-limiting portion 36 is located on an axial side (for example, a side close to the cover plate 50) of the holder 31, and the second position-limiting portion 13 is located on a corresponding axial side of the first rotating member 10. As shown in FIG. 6, during operation of the engagement and disengagement device, when the first position-limiting portion 36 and the second position-limiting portion 13 abut each other, the first rotating member 10 and the holder 31 remain stationary relative to each other.

In an exemplary embodiment, the engagement portion 12 and the second position-limiting portion 13 of the first rotating member 10 may be arranged axially in sequence, as shown in FIG. 1. In addition, the first position-limiting portion 36 of the holder 31 is axially disposed on an outer side the engagement portion. In this case, engagement between the first rotating member 10 and the transmission member 30 is not affected by the position-limiting portions.

According to an embodiment of the present invention, the engagement and disengagement device may further include a second elastic component 34, as shown in FIG. 2. The second elastic component 34 is used to exert a biasing force that enables the transmission member 30 to abut the cover plate 50, and the second elastic component 34 is integrated on the holder 31. In an exemplary embodiment, the second elastic component 34 is provided on an axial end surface of the holder 31 opposite the cover plate 50, and the second elastic component 34 extends axially towards the cover plate 50 so as to extend beyond the holder 31 by a distance, such that when the transmission member 30 is close to the cover plate 50, the second elastic component 34 can deform, under the action of the cover plate 50, in a direction away from the cover plate 50. In order to restore from deformation, the second elastic component 34 abuts the cover plate 50. That is, the second elastic component 34 exerts a biasing force that enables the transmission member 30 to abut the cover plate 50. Specifically, as shown in FIG. 2, the second elastic component 34 is configured such that one end thereof is fixed to the holder 31 and the other end thereof is bent to form a bent portion. In addition, the first position-limiting portion 36 and the second elastic component 34 are provided on the same axial end surface of the holder 31.

The second elastic component 34 can exert a biasing force on the transmission member 30, so as to generate a frictional force between the transmission member 30 and the cover plate 50. At the very beginning of rotation of the first rotating member 10, the second elastic component 34 may be subject to the frictional force and remain stationary, thereby facilitating quick engagement or disengagement between the transmission member 30 and the second rotating member 20.

A method for operating the engagement and disengagement device according to an embodiment of the present invention will be described below.

When the engagement and disengagement device is in the disengaged state, as shown in FIG. 6, the transmission element 32 is circumferentially located in a position on the engagement portion 12 close to the toothed portion 11, and the transmission element 32 is radially and outwardly subject to the biasing force of the first elastic component 33, such that the transmission element 32 radially disengages from the second rotating member 20. When switching from the disengaged state to the engaged state, the first rotating member 10 is first driven by the driving device to rotate in the first rotation direction C1. Due to the biasing force of the second elastic component 34, the transmission member 30 is subject to the frictional force between the transmission member 30 and the cover plate 50, and therefore remains stationary in an initial stage. The engagement portion 12 of the first rotating member 10 and the transmission element 32 of the transmission member 30 radially engage with each other in a gap-free manner. As the first rotating member 10 rotates, the engagement portion 12 exerts a force on the transmission element 32, such that the transmission element 32 radially and gradually approaches a radial outer surface of the second rotating member 20. When the transmission element 32 moves to engage with the radial outer surface of the second rotating member 20 in a gap-free manner, the first rotating member 10 can drive, by means of the transmission element 32, the second rotating member 20 to rotate, such that the engagement and disengagement device is in the engaged state, as shown in FIG. 3 and FIG. 4.

When the engagement and disengagement device is in the engaged state, as shown in FIG. 2 and FIG. 3, the transmission element 32 is circumferentially located in a position on the engagement portion 12 located farther away from the toothed portion 11. The transmission element 32 engages with the engagement portion 12, and is radially and inwardly subject to the force of the engagement portion 12, so as to overcome the biasing force of the elastic component 33 and radially engage with the second rotating member 20. When switching from the engaged state to the disengaged state, the first rotating member 10 is first driven by the driving device to rotate in the second rotation direction C2. Due to the biasing force of an elastic component 60, the transmission member 30 is subject to the frictional force between the transmission member 30 and the cover plate 50, and therefore remains stationary in an initial stage. As the first rotating member 10 rotates, the elastic component 33 radially and outwardly exerts a biasing force on the transmission element 32, such that the transmission element 32 radially and gradually moves away from the radial outer surface of the second rotating member 20. When the transmission element 32 moves to disengage from the radial outer surface of the second rotating member 20, the first rotating member 10 and the second rotating member 20 may rotate freely relative to each other, such that the engagement and disengagement device is in the disengaged state, as shown in FIG. 6.

According to an embodiment of the present invention, when the engagement and disengagement device is in the disengaged state, the transmission element and the second rotating member are radially spaced apart from each other, such that an input end and an output end of the engagement and disengagement device can be completely separated from each other. In an initial stage of state switching of the engagement and disengagement device, due to a frictional force between the holder and the cover plate, the transmission element enables the first rotating member and the second rotating member to engage with each other at a smaller rotation angle. Thus, the engagement and disengagement device of the present invention can reduce an engagement and disengagement delay, so as to wind a seat belt quickly to provide protection to an occupant. In addition, due to the frictional force between the holder and the cover plate, the engagement and disengagement device can achieve engagement or disengagement even when the rotational speed of a motor is low, thereby reducing noise and impacts. The engagement and disengagement device can realize the function of comfort that requires low speed start-up, has less parts and a simple structure, and is easy to install.

The transmission element in the above description is a rolling element. However, the present invention is not limited thereto. According to an embodiment of the present invention, the transmission element may also be in other forms, such as a wedge, etc.

According to the above description, when the engagement and disengagement device is in the disengaged state, the transmission element 32 of the transmission member 30 does not engage with the second rotating member 20. However, the present invention is not limited thereto. According to an embodiment of the present invention, the engagement and disengagement device may further be configured such that when the engagement and disengagement device is in the disengaged state, the transmission element 32 does not engage with the first rotating member 10 (for example, the engagement portion 12). For example, the elastic component 33 can radially and inwardly exert a biasing force on the transmission element 32. When the first rotating member 10 rotates in the second rotation direction, the transmission element 32 radially and gradually moves away from the engagement portion 12 of the first rotating member 10, such that the engagement and disengagement device is in the disengaged state.

As described above, although the exemplary embodiments of the present invention have been described with reference to the accompanying drawings in the description, the present invention is not limited to the aforementioned specific embodiments, and the protection scope of the present invention should be defined by the claims and equivalent meanings thereof.

The invention claimed is:

1. An engagement and disengagement device, used in a seat belt retractor, comprising:
   a first rotating member, capable of being driven to rotate about a rotation axis thereof;
   a second rotating member, provided coaxially with the first rotating member, and connected to a reel of the seat belt retractor; and a transmission member, provided between the first rotating member and the second rotating member, wherein the first rotating member is capable of transmitting, in a first rotation direction, torque to the second rotating member by means of the transmission member, wherein the transmission member is capable of rotating between an engagement position and a non-engagement position relative to the first rotating member, and when the transmission member is at the engagement position, the transmission member engages with both the first rotating member and the second rotating member such that the first rotating member, the second rotating member, and the transmission member are capable of rotating together, and when the transmission member is at the non-engagement position, the transmission member does not engage with the first rotating member or the second rotating member such that the first rotating member and the second rotating member are capable of rotating freely relative to each other, and, the transmission member comprises a holder and a transmission element provided in the holder, and the engagement and disengagement device further comprises a first elastic component used to elastically hold the transmission element by radially exerting, on the transmission element, a force that enables the transmission element to be located away from the first rotating member or the second rotating member, the first elastic component being integrated on the holder, wherein the holder has an annular shape, and is rotatably sleeved on the second rotating member.

2. The clutch device according to claim 1, wherein the holder comprises a first side ring and a second side ring, and the first elastic component is located between the first side ring and the second ring.

3. The engagement and disengagement device according to claim 2, wherein the first elastic component comprises a cantilever spring, one end of the cantilever spring being fixed to the holder, and the other end extending to the transmission element.

4. The engagement and disengagement device according to claim 3, wherein the holder further comprises a connection member connected between the first side ring and the second side ring, and an end of the first elastic component is fixed to the connection member.

5. The engagement and disengagement device according to claim 4, wherein multiple first elastic components are arranged at intervals in a circumferential direction of the holder, and a pair of the first elastic components are configured to be located on two circumferential sides of the transmission element.

6. The engagement and disengagement device according to claim 1, further comprising a base provided with an accommodation cavity used to accommodate the first rotating member and the transmission member.

7. The engagement and disengagement device according to claim 6, further comprising a cover plate connected to the base to seal the accommodation cavity.

8. The engagement and disengagement device according to claim 7, wherein the engagement and disengagement device further comprises a second elastic component, and the second elastic component is used to exert a biasing force that enables the transmission member to abut the cover plate, the second elastic component being integrated on the holder.

9. The engagement and disengagement device according to claim 8, wherein the second elastic component is provided on an axial end surface of the holder opposite the cover plate.

10. The engagement and disengagement device according to claim 9, wherein the second elastic component extends axially towards the cover plate so as to extend beyond the holder by a distance.

11. The engagement and disengagement device according to claim 10, wherein the second elastic component is configured such that one end thereof is fixed to the holder and the other end thereof is bent to form a bent portion.

12. The engagement and disengagement device according to claim 11, wherein the holder comprises a first position-limiting portion located on an axial end surface thereof, the first rotating member comprises a second position-limiting portion located on a corresponding axial end surface thereof, and the first position-limiting portion and the second position-limiting portion are capable of cooperating with each other to limit a rotation angle of the holder relative to the first rotating member.

13. The engagement and disengagement device according to claim 12, wherein the first position-limiting portion and the second elastic component are provided on the same axial end surface of the holder.

14. An engagement and disengagement device, used in a seat belt retractor, comprising:
a first rotating member, capable of being driven to rotate about a rotation axis thereof;
a second rotating member, provided coaxially with the first rotating member, and connected to a reel of the seat belt retractor; and
a transmission member, provided between the first rotating member and the second rotating member, wherein the first rotating member is capable of transmitting, in a first rotation direction, torque to the second rotating member by means of the transmission member, wherein the transmission member is capable of rotating between an engagement position and a non-engagement position relative to the first rotating member, and when the transmission member is at the engagement position, the transmission member engages with both the first rotating member and the second rotating member such that the first rotating member, the second rotating member, and the transmission member are capable of rotating together, and when the transmission member is at the non-engagement position, the transmission member does not engage with the first rotating member or the second rotating member such that the first rotating member and the second rotating member are capable of rotating freely relative to each other, and, the transmission member comprises a holder and a transmission element provided in the holder, the engagement and disengagement device further comprises a first elastic component used to elastically hold the transmission element by radially exerting, on the transmission element, a force that enables the transmission element to be located away from the first rotating member or the second rotating member, the first elastic component being integrated on the holder, and the engagement and disengagement device further comprises a base provided with an accommodation cavity used to accommodate the first rotating member and the transmission member, and formed with an annular shape such that the accommodation cavity of the base circumferentially encloses the first rotating member and the transmission member, and a cover plate connected to the base to seal the accommodation cavity.

15. The engagement and disengagement device according to claim 14, wherein the engagement and disengagement device further comprises a second elastic component, and the second elastic component is used to exert a biasing force that enables the transmission member to abut the cover plate, the second elastic component being integrated on the holder.

* * * * *